United States Patent
Wang et al.

(10) Patent No.: US 7,180,635 B2
(45) Date of Patent: *Feb. 20, 2007

(54) HALFTONE IMAGE GLOSS CONTROL FOR GLOSSMARKS

(75) Inventors: Shen-ge Wang, Fairport, NY (US); Beilei Xu, Penfield, NY (US); Chu-heng Liu, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 937 days.

This patent is subject to a terminal disclaimer.

(21) Appl. No.: 10/159,423

(22) Filed: May 30, 2002

(65) Prior Publication Data

US 2003/0231349 A1   Dec. 18, 2003

(51) Int. Cl.
H04N 1/405 (2006.01)
G06K 15/00 (2006.01)
B41M 3/10 (2006.01)

(52) U.S. Cl. .................. 358/3.06; 358/3.2; 358/3.28

(58) Field of Classification Search .............. 358/1.9, 358/3.06, 3.13–3.2, 3.09, 3.26–3.28, 533–536; 382/270; 283/93, 113, 902
See application file for complete search history.

(56) References Cited

U.S. PATENT DOCUMENTS

| | | |
|---|---|---|
| 3,784,289 A | 1/1974 | Wicker |
| 4,149,194 A | 4/1979 | Holladay |
| 4,210,346 A | 7/1980 | Mowry, Jr. et al. |
| 4,310,180 A | 1/1982 | Mowry, Jr. et al. |
| 5,087,507 A | 2/1992 | Heinzer |
| 5,487,567 A | 1/1996 | Volpe |
| 5,583,660 A | 12/1996 | Rylander |
| 5,678,133 A | 10/1997 | Siegel |
| 5,695,220 A | 12/1997 | Phillips |
| 5,734,752 A | 3/1998 | Knox |
| 5,788,285 A | 8/1998 | Wicker |
| 5,853,197 A | 12/1998 | Mowry, Jr. et al. |
| 6,108,512 A | 8/2000 | Hanna |
| 6,606,168 B1 * | 8/2003 | Rylander ............ 358/3.09 |
| 6,714,320 B1 * | 3/2004 | Nakahara et al. ...... 358/3.13 |
| 6,906,825 B1 * | 6/2005 | Nakahara et al. ...... 358/1.9 |
| 2004/0000786 A1 * | 1/2004 | Xu et al. ............. 358/3.06 |
| 2004/0001233 A1 * | 1/2004 | Wang et al. .......... 358/3.06 |

(Continued)

FOREIGN PATENT DOCUMENTS

EP    0 859 506 A1    8/1998

(Continued)

OTHER PUBLICATIONS

"Automated Void Pantograph Detection", IBM® Technical Disclosure Bulletin, IBM Corp., New York, US., vol. 38, No. 8, Aug. 1, 1995, pp. 457-458, XP000534589.

*Primary Examiner*—Scott A. Rogers
(74) *Attorney, Agent, or Firm*—Christopher D. Wait

(57) ABSTRACT

The present invention relates to the manipulation of differential gloss as may be inherent in halftoned images. By selectively applying halftones with anisotropic structure characteristics which are significantly different in orientation while remaining identical in density, a gloss image may be superimposed within an image without the need for special toners or paper. Conventional copier systems will not typically be able to copy such a superimposed gloss image.

34 Claims, 3 Drawing Sheets

U.S. PATENT DOCUMENTS

2004/0114160 A1* 6/2004 Wang et al. .................. 358/1.9
2005/0128524 A1* 6/2005 Liu et al. .................... 358/3.06
2005/0286083 A1* 12/2005 Wang et al. ............... 358/3.06
2006/0072159 A1* 4/2006 Eschbach et al. .......... 358/3.06

FOREIGN PATENT DOCUMENTS

GB     2 040 224 A     8/1980
GB     2 217 258 A     10/1989

* cited by examiner

HALFTONE IMAGE GLOSS CONTROL FOR GLOSSMARKS

RELATED CASES

Cross reference is made to the following related application incorporated by reference herein: application Ser. No. 10/159,432, entitled "APPLICATION OF GLOSSMARKS FOR GRAPHICS ENHANCEMENT" to inventors Shen-ge Wang, Beilei Xu, and Chu-heng Liu.

BACKGROUND

The present invention relates generally the gloss inherent in the hardcopy of image data be it pictorial or text. More particularly, this invention relates to as halftoned image data and the control of differential gloss when that halftone image data is printed into hardcopy.

It is desirable to have a way to protect against the copying of a document. Most desirably in a manner that part of the content can be readily observed by a human reader but not by a copier scanner. One approach is where an image is printed using clear toner or ink, creating a difference in reflected light and diffused light that can be discerned by a human reader by holding the paper at an angle, but can not be detected by a copier scanner which is restricted to reading at right angles to the page.

There has been a need for a printer that can print a page that can be read but not copied. One method, described in U.S. Pat. Nos. 4,210,346 and 5,695,220, is to use a particular white toner and a particular white paper that are designed to have different diffused light characteristics at different angles. Of course, this system requires special, matched paper and toner.

In U.S. Pat. No. 6,108,512 to Hanna, the invention described discloses a system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a right angle. In this case, the diffused light is approximately equal for both toned and untoned surfaces, the scanner will detect no difference and the copier will not be able to copy the original.

Another approach taken to provide a document for which copy control is provided includes digital watermarking. As an example in U.S. Pat. No. 5,734,752 to Knox, there is disclosed a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

All of the above are herein incorporated by reference in their entirety for their teaching.

Therefore, as discussed above, there exists a need for an arrangement and methodology which will control gloss and allow manipulation for glossmarks without requiring special toners/inks or paper/substrates, nor require the superimposition of additional prints to allow viewing. Included in this need is the desirability of generating an image which may not be readily copied yet is readily discernable as such to the unaided observer. Thus, it would be desirable to solve this and other deficiencies and disadvantages as discussed above, with an improved methodology for the manipulation of inherent gloss.

The present invention relates to a method for the manipulation of the differential gloss as may be inherent in a halftone image comprising the steps of selecting a first halftone having a first anisotropic structure orientation, and then selecting a second halftone having a second anisotropic structure orientation different from the first halftone. The first halftone being applied to at least one portion of the halftone image, and the second halftone being applied to the remaining portions of the halftone image.

In particular, the present invention relates to a method for the manipulation of the perceived gloss in a halftone image comprising the steps of selecting a first halftone having an anisotropic structure orientation, selecting a second halftone having a structure different from that of the first halftone, applying the first halftone to at least some portion of the halftone image, and applying the second halftone to the remaining portion of the halftone image.

The present invention also relates to a method for the manipulation of the perceived gloss in a halftone image comprising the steps of selecting a first halftone having a first anisotropic structure orientation, selecting a second halftone having a second anisotropic structure orientation different from that of the first halftone, then selecting a third halftone having a structure different from both the first halftone and the second halftone. The steps which follow entail applying the first halftone to at least some portion of the halftone image, applying the second halftone to another portion of the halftone image, and applying the third halftone to the remaining portion of the halftone image.

Further, the present invention relates to a halftone image comprising a first halftone having an anisotropic structure orientation and at least one additional halftone type having a structure different from the first halftone. The first halftone is applied to a portion of the halftone image, and the at least one additional halftone type is applied to the remainder of the image.

DESCRIPTION

By proper utilization of the perceived differential gloss inherent between various anisotropic halftone dot structures, the desired manipulation of perceived gloss and the generation of glossmarks via that differential gloss may be achieved without the need for special paper or special toners or inks.

Figure 1:
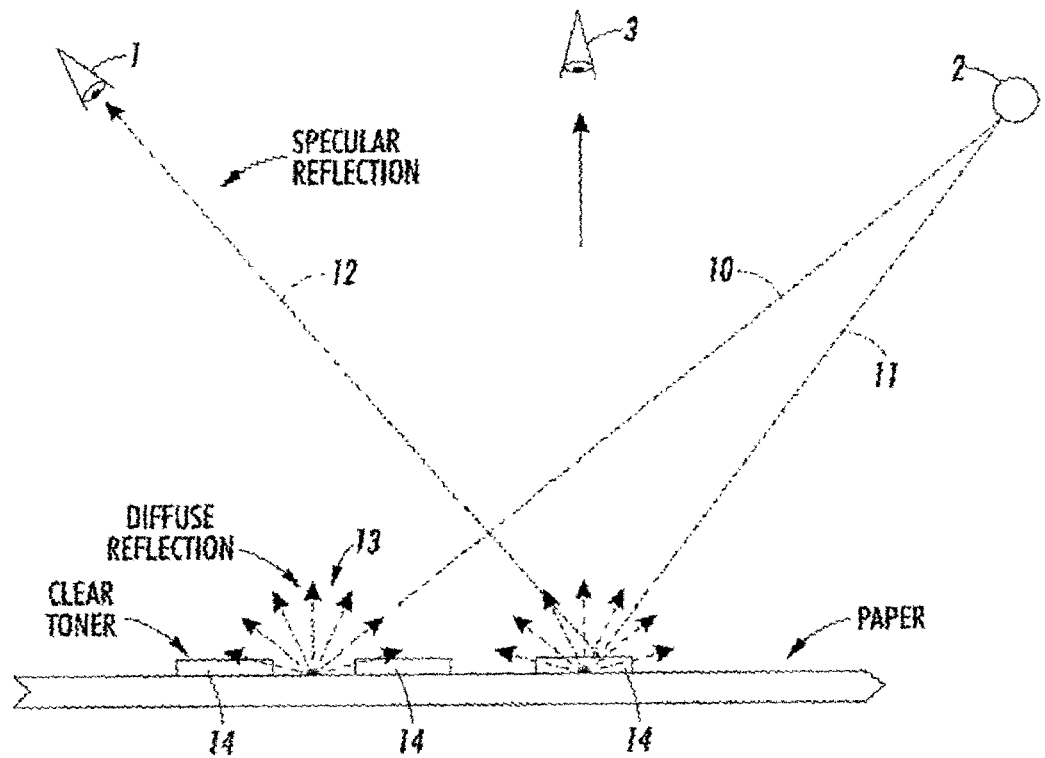
FIG. 1 shows how the human eye can detect a large difference between the glossy portions of the page but a scanner detector cannot.

FIG. 1 shows how the human eye 1 can read gloss upon the page and a scanner cannot. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner 3 reads incident light at right angles to the paper. In this case, there is only a small amount of diffused light coming from both the glossy and non-glossy dots, and the scanner can not detect a difference. This is one manner for creating a gloss image which cannot be scanned by conventional copiers and scanners.

Figure 2:
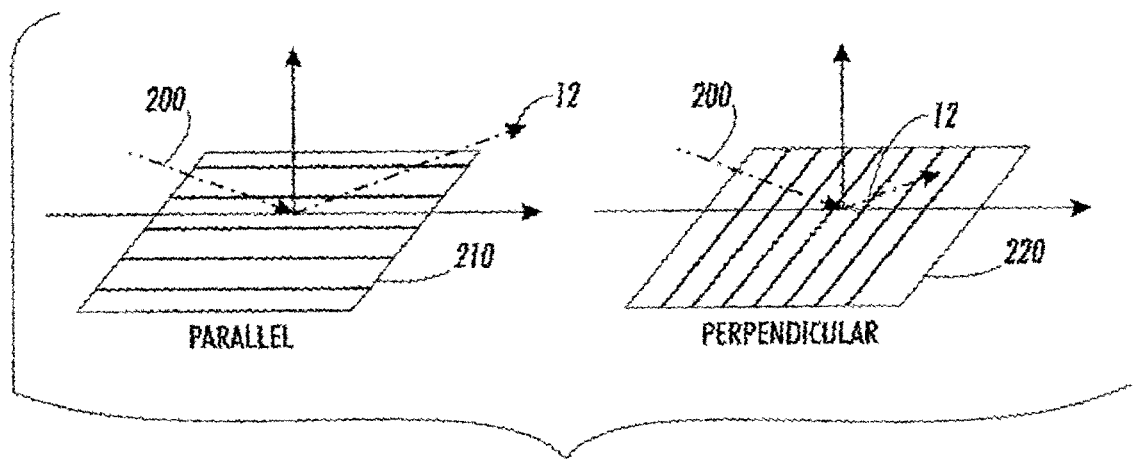
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to impinging incident light 200, a parallel orientation 210, and a perpendicular orientation 220. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a glossmark. The perceptibility of this gloss differential will be maximized when the halftone anisotropic orientations are 90 degrees apart as shown here in FIG. 2.

Figure 3:
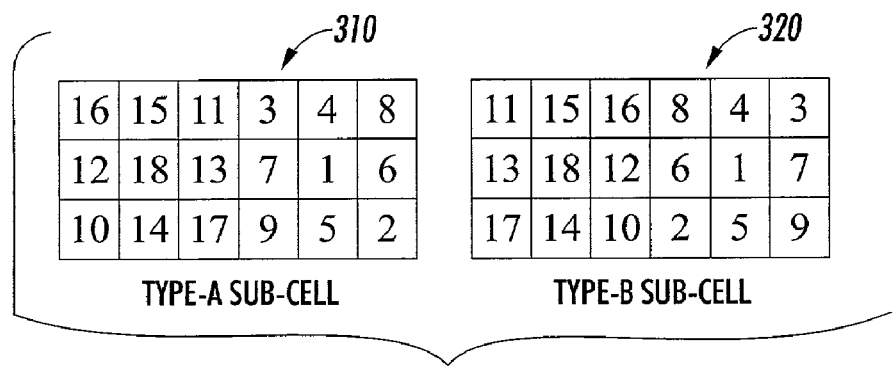
FIG. 3 shows two 3×6 halftone patterns suitable in anisotropic structure to produce discernable gloss differential for practicing the present invention.
Figure 4:
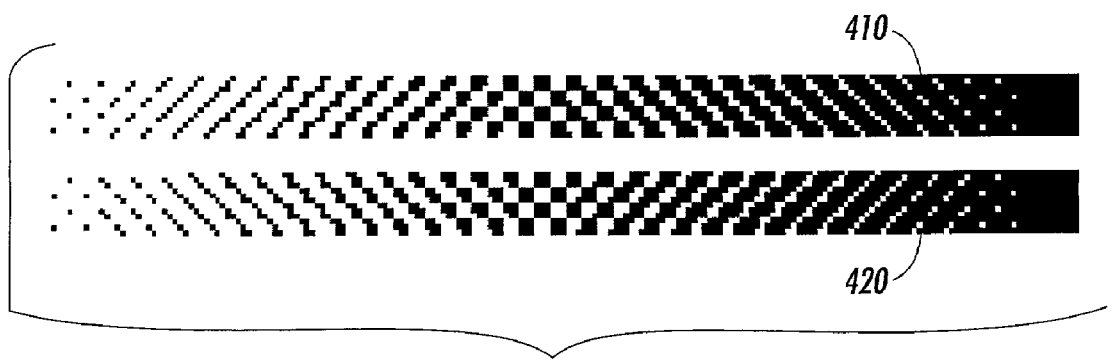
FIG. 4 is a density sweep of the two halftone patterns of FIG. 3.

FIG. 3 shows example halftone cells suitable for a skilled practitioner to employ in an embodiment employing the teachings of the present invention. They are but one useful example as will be evident to those skilled in the art. Each halftone cell is comprised as a three by six pixel array. The turn on/off sequence is numerically indicated. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other.

Figure 5:
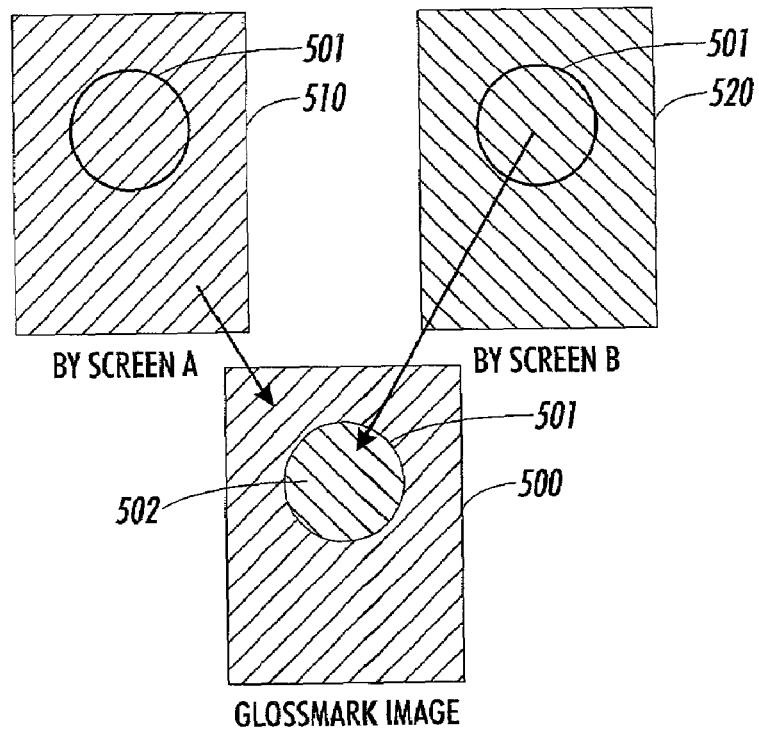
FIG. 5 depicts a patchwork alternating of the two halftone patterns of FIG. 3 so as to achieve a glossmark.

FIG. 5 depicts a glossmark image 500 achievable using halftone cells as described above. Screen-A 510 uses one halftone cell type and screen-B 520 uses the other. The circle 501 is provided as a visual aid across the image screens 500, 510 and 520. The desired glossmark here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patch-worked together to create the glossmark image 500.

Figure 6:
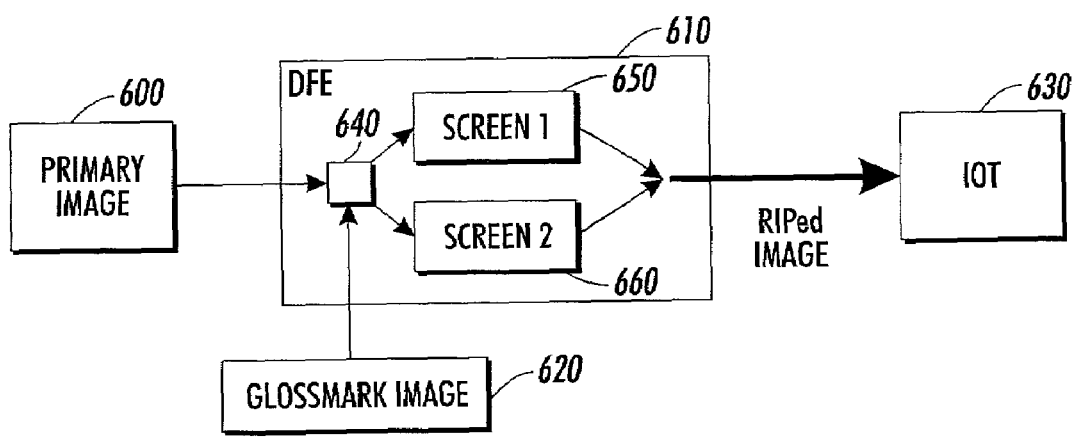
FIG. 6 shows one embodiment for achieving the image directed alternation of the halftone patterns for glossmarks as depicted in FIG. 5, utilizing the halftone patterns of FIG. 3.

An another approach for the assembly of a glossmark image is diagramed in FIG. 6. Here, the primary image 600 is received as input data to the digital front-end (DFE) 610 as is normal. However, a desired glossmark image 620 is also received as input data to the DFE 610 as well. The processed image as sent to the image output terminal (IOT) 630 is gray-scaled, the halftone density being driven by the primary image 600 data as is normal. However, the halftone type selection is driven by the intended glossmark image data 620 as input to multiplexer switch 640. The intended glossmark image data 620 will serve to direct a portion of the primary image 600 to use a first anisotropic structured halftone while directing an alternative halftone to be used for the remainder of primary image 600. As will be understood by those skilled in the art, the intended glossmark image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660, as dictated by the desired glossmark data 620, to produce the composite result of raster input processed (RIP) image data as passed to the IOT 630. In this way, a superimposition of a pattern 620 is imbedded into the primary image 600 which can only be perceived as gloss differential glossmark.

In closing, by alternating between two halftone types, carefully selected such that each has identical matching density characteristics while displaying distinctly different anisotropic structure orientations will enable the super imposition of a glossmark image without the need for special toners or paper. This manipulation of gloss differentials will, of course, be best utilized with toner/ink and substrate systems which themselves best display inherent gloss characteristics. Examples of such systems comprise electrostaticgraphic and quality ink-jet systems. While wax based systems typically have less inherent gloss, they may well prove amendable to techniques which increase their inherent gloss. In just such a scenario, the teachings herein are anticipated to apply such wax based systems as well. It will be appreciated by those skilled in the art that these teachings will apply to both monochromatic, black and white, as well as color images and upon plain paper, glossy paper or transparencies. Those skilled in the art will also understand that this manipulation of inherent anisotropic gloss differential will be weak where either there is a solid black area (solid toner/ink) or a white and therefore toner-less/ink-less area. That is because these areas will not best exhibit the anisotropic structures of the selected halftones.

While the embodiments disclosed herein are preferred, it will be appreciated from this teaching that various alternative modifications, variations or improvements therein may be made by those skilled in the art. For example, it will be understood by those skilled in the art that the teachings provided herein may be applicable to many types of halftone cell types and arrangements including selecting more than two different halftone structures, as well being applicable to many types of toner/ink and substrate types. All such variants are intended to be encompassed by the following claims:

The invention claimed is:

1. A method for the manipulation of the differential gloss in a halftone image comprising the steps of:
   selecting a first halftone having a first anisotropic gloss structure orientation;
   selecting a second halftone having a second anisotropic gloss structure orientation different from that of the first halftone;
   applying the first halftone to at least some portion of the halftone image; and
   applying the second halftone to the remaining portion of the halftone image so a gloss differential pattern is superimposed when the halftone image is rendered.

2. The method of claim 1 wherein the first anisotropic gloss structure orientation and the second gloss anisotropic structure orientation are 90 degrees apart.

3. The method of claim 2 wherein the first anisotropic gloss structure has a parallel orientation and the second anisotropic gloss structure has perpendicular orientation.

4. The method of claim 3 wherein the first and second halftones are line type halftones.

5. The method of claim 3 wherein the first and second halftones are dot type halftones.

6. The method of claim 2 wherein the first anisotropic gloss structure has a 45 degree orientation to the right and the second anisotropic gloss structure has a 45 degree orientation to the left.

7. The method of claim 1 wherein the first anisotropic gloss structure orientation and the second anisotropic gloss structure orientation are less than 90 degrees apart.

8. The method of claim 1 wherein the halftone image is intended for an inkjet printer.

9. The method of claim 1 wherein the halftone image is intended for an electrostaticgraphic printer.

10. The method of claim 1 wherein the halftone image is intended for printing upon paper.

11. The method of claim 1 wherein the halftone image is intended for printing upon a transparency.

12. A method for the manipulation of the perceived gloss in a halftone image comprising the steps of:
    selecting a first halftone having an anisotropic gloss structure orientation;
    selecting a second halftone having a structure different from that of the first halftone;
    applying the first halftone to at least some portion of the halftone image; and
    applying the second halftone to the remaining portion of the halftone image so a gloss differential pattern is superimposed when the halftone image is rendered.

13. The method of claim 12 wherein the second halftone is a stochastic type.

14. The method of claim 12 wherein the second halftone is a cluster dot type.

15. The method of claim 12 wherein the halftone image is intended for an ink jet printer.

16. The method of claim 12 wherein the halftone image is intended for an electrostaticgraphic printer.

17. A method for the manipulation of the differential gloss in a halftone image comprising the steps of:
    selecting a first halftone having a first anisotropic gloss structure orientation;
    selecting a second halftone having a second anisotropic gloss structure orientation different from that of the first halftone;
    selecting a third halftone having a structure different from both the first halftone and the second halftone;
    applying the first halftone to at least some portion of the halftone image;
    applying the second halftone to another portion of the halftone image; and
    applying the third halftone to the remaining portion of the halftone image so a gloss differential pattern is superimposed when the halftone image is rendered.

18. The method of claim 17 wherein the first anisotropic gloss structure orientation and the second anisotropic gloss structure orientation are 90 degrees apart.

19. The method of claim 17 wherein the first anisotropic gloss structure orientation and the second gloss anisotropic structure orientation are less than 90 degrees apart.

20. The method of claim 18 wherein the third halftone has an anisotropic gloss structure orientation different from both the first halftone and the second halftone.

21. The method of claim 18 wherein the third halftone is a stochastic type of halftone.

22. The method of claim 18 wherein the third halftone is a cluster dot type of halftone.

23. The method of claim 21 wherein the first anisotropic gloss structure has a 45 degree orientation to the right and the second anisotropic gloss structure has a 45 degree orientation to the left.

24. The method of claim 23 wherein the halftone image is intended for an electrostaticgraphic printer.

25. The method of claim 23 wherein the halftone image is intended for an ink jet printer.

26. A halftone image comprising:
    a first halftone having an anisotropic gloss structure orientation; and
    at least one additional halftone type having a structure different from the first halftone, where the first halftone is applied to a portion of the halftone image and the at least one additional halftone type is applied to the remainder of the image so a gloss differential pattern is superimposed when the halftone image is rendered.

27. The halftone image of claim 26 wherein the at least one additional halftone type has an anisotropic gloss structure orientation different from that of the first halftone.

28. The halftone image of claim 27 wherein the anisotropic gloss structure orientation of the first halftone and the anisotropic gloss structure orientation of the at least one additional halftone are 90 degrees apart.

29. The halftone image of claim 27 wherein the anisotropic gloss structure orientation of the first halftone and the anisotropic gloss structure orientation of the at least one additional halftone are less than 90 degrees apart.

30. The halftone image of claim 28 wherein the anisotropic gloss structure orientation of the first halftone has a 45 degree orientation to the right and the anisotropic gloss structure orientation of the at least one additional halftone has a 45 degree orientation to the left.

31. The halftone image of claim 26 wherein the at least one additional halftone type is a stochastic type of halftone.

32. The halftone image of claim 26 wherein the at least one additional halftone type is a cluster dot type of halftone.

33. The halftone image of claim 30 wherein the halftone image is intended for an electrostaticgraphic printer.

34. The halftone image of claim 30 wherein the halftone image is intended for an ink jet printer.

* * * * *